United States Patent
Hernek (10) Patent No.: US 7,634,475 B1
(45) Date of Patent: Dec. 15, 2009

(54) RELEVANCE SCORING BASED ON OPTIMIZED KEYWORD CHARACTERIZATION FIELD COMBINATIONS

(75) Inventor: Diane Hernek, Oakland, CA (US)

(73) Assignee: A9.com, Inc., Palo Alto, CA (US)

( * ) Notice: Subject to any disclaimer, the term of this patent is extended or adjusted under 35 U.S.C. 154(b) by 296 days.

(21) Appl. No.: 11/684,805

(22) Filed: Mar. 12, 2007

(51) Int. Cl.
*G06F 17/30* (2006.01)
(52) U.S. Cl. .................................. 707/5; 707/4; 707/7
(58) Field of Classification Search ........................ 707/5
See application file for complete search history.

(56) References Cited

U.S. PATENT DOCUMENTS 7,308,464 B2 * 12/2007 Nowitz et al. ............ 707/104.1
2005/0086215 A1 * 4/2005 Perisic ............................ 707/3
2006/0069678 A1 * 3/2006 Chou et al. ..................... 707/5

* cited by examiner

*Primary Examiner*—Shahid A Alam
*Assistant Examiner*—Mark E Hershley
(74) *Attorney, Agent, or Firm*—Townsend and Townsend and Crew LLP (57) ABSTRACT

A technique for associating keywords with a set of items is provided. The present invention associates one or more keywords with terms found in the two or more characterization fields of an item. Each combination associates each keyword with at most one field. The present invention then calculates a keyword relevancy score for the set of potential keyword field combinations and identifies the keyword field combination with an optimal keyword relevancy score for the item. The method further includes displaying a list of results based on keyword relevancy scores for items.

32 Claims, 5 Drawing Sheets

RELEVANCE SCORING BASED ON OPTIMIZED KEYWORD CHARACTERIZATION FIELD COMBINATIONS

FIELD

The present invention relates to relevance scoring, and, more particularly, relates to a system and method for determining relevance scores based on keyword/field combinations that associate a set of keywords with a number of data fields.

BACKGROUND

Generally described, computing devices and communication networks, such as the Internet, provide computer users with access to a wide variety of electronically accessible material. One tool typically used for searching electronically accessible material is a search engine. Search engines provide the ability to identify a set of electronically accessible material whose elements are most relevant to a search query. Search engines typically process search queries by first obtaining search criteria, such as keywords, Boolean logic, field/date restrictions and other criteria, from a user. The search engine can then implement a search algorithm that associates the search criteria to a search engine index representative of available electronically accessible material. By associating the search criteria with the search engine index, the search engine identifies the most relevant electronically accessible material from the search engine index.

In one embodiment, the algorithm implemented by a search engine can utilize a number of processing rules to identify the most relevant search engine index entries and/or prioritize search index entries that are most relevant to a search query. For example, the processing rules can associate a value, or score, based on a determination of whether keywords in a submitted search query can be found in the search engine index entry. Additionally, the processing rules can associate an additional value and/or deduct a value based on a relationship between the associated keywords, such as proximity. The sum of the outputs of the processing rules can be generally referred to as a relevancy score for the keywords to the search index entry.

In a typical embodiment, a search engine index can correspond to a set of structured fields representative of various aspects of the available materials, generally referred to as characterization fields. For example, entries in a search engine index storing information about printed publications could include a set of structured fields corresponding to aspects of the publications. The printed publications' structured fields could include fields such as title, author, publisher, content key terms, text of the publication, publication summaries, and the like. Depending on the format/criteria for the characterization fields, the search engine index may have duplicative information in the characterization fields. For example, a full text of the publication characterization field may include title and author information, which could also be found in the title characterization field and the author characterization field (e.g. a title characterization field of "Stephen E. Ambrose—Citizen Soldiers" and an author characterization field of "Stephen E. Ambrose").

In embodiments in which search engine indexes include multiple structured fields for each search index entry, search engine processing rules can become more difficult to implement. In one approach, the processing rules can be applied to each characterization field in the search index entry. For example, the processing rules can provide a score for the presence and proximity of search criteria keywords for each characterization field. The relevancy of the search engine index entry could then be based on a cumulative processing rule score for each search engine index entry. However, this approach could result in the consideration of the same associated keywords in multiple characterization fields. For instance, in a search index corresponding to printed publications having multiple characterization fields, a search query for "John Grisham—The Innocent Man," could result in higher keyword relevancy scoring for all search engine index entries having "John Grisham" in the title field, the author field, and in the text of the document (e.g., "John Grisham—The Chamber", "John Grisham—The Client", etc.). Because of higher keyword relevancy scores for a set of search engine index entries, the most relevant search index entry (e.g., corresponding to the "Innocent Man" publication) may not be readily apparent in the search engine results.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a system for determining an association of keywords to a set of items for relevance scoring is presented. The system comprises a data store for storing information about the set of items. Each item is characterized by a set of fields. Each field contains terms specific to that item. The system further comprises an interface for obtaining one or more keywords from a user. Still further, the system comprises a data processing component having an executable component. When executed, the data processing component determines a set of potential keyword field combinations by associating the one or more keywords with terms found in the two or more characterization fields of the item. Each combination associates each keyword with at most one field. The data processing component then calculates a keyword relevancy score for the set of potential keyword field combinations and identifies the keyword field combination with an optimal keyword relevancy score for the item.

In accordance with another aspect of the present invention, a method and technique for determining an association of keywords to a set of items is provided. The method includes obtaining one or more keywords. The method takes the one or more keywords and determines a set of potential keyword field combinations by associating the one or more keywords with terms found in the two or more characterization fields of the item. Each combination associates each keyword with at most one field. The method further calculates a keyword relevancy score for the set of potential keyword field combinations and identifies the keyword field combination with the optimal keyword relevancy score for the item.

In accordance with still yet another aspect of the present invention, a computer-readable media storing instructions for causing at least one processor to perform a method that identifies items relevant to a search query is presented. The method includes obtaining one or more keywords. The method takes the one or more keywords and determines a set of potential keyword field combinations corresponding to the association of one or more keywords with terms found in the two or more characterization fields of the item. Each combination associates each keyword with at most one field.

The execution of the instructions further cause the processor to calculate a keyword relevancy score for the set of potential keyword field combinations and identify the keyword field combination with the optimal keyword relevancy score for the item. Such rules associate a value, or score, based on a determination of whether keywords can be found in the field. Additionally, the processing rules can associate an additional value and/or deduct value based on a relationship between the associated keywords, such as proximity. The method is repeated for each item within the set of items. Furthermore, the method ranks the set of items corresponding to the optimal keyword relevancy scores for each item.

In accordance with another aspect of the present invention, a search engine for determining an association of keywords to a set of items that provides optimized search results is presented. The search engine comprises a data store for storing information about the set of items, wherein the information stored on the data store includes two or more characterization fields that describe each item. The search engine comprises an interface for obtaining one or more keywords and a data processing component having an executable component. When executed, the data processing component for each item in the set of items determines a set of potential keyword field combinations, wherein the set of potential keyword field combinations associates the one or more keywords with terms found in the two or more characterization fields of each item. Each potential keyword field combination associates each keyword with at most one field. The data processing component then calculates a keyword relevancy score for the set of potential keyword field combinations and identifies the keyword field combination with an optimal keyword relevancy score for each item. When further executed, the data processing component ranks the set of items corresponding to the optimal keyword relevancy scores for each item. A set of ranked items is provided corresponding to the optimized keyword relevancy scores for each item.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to systems and methods for identifying relevant items in a search query. More specifically, the present invention relates to the determination of relevancy of search engine index entries to a set of search criteria by optimizing keyword associations to a set of characterization fields in each search engine index entry. In an illustrative embodiment, each search index entry corresponds to items of content available for association with a search query. For example, the content can correspond to goods or services available for sale. The set search engine index entries can correspond to a set of structured characterization fields including information describing the particular item of content.

To obtain an optimized relevancy score that is utilized by a search engine to identify the most relevant items of content, the search engine applies keyword processing rules, such as proximity scoring rules, to a set of potential keyword-field combinations for each search engine index entries. In an illustrative embodiment, the application of the keyword processing rules to each characterization field associates a value, or score, based on a determination of whether keywords can be found in the characterization field. Additionally, the processing rules can associate an additional value and/or deduct a value based on a relationship between the associated keywords, such as proximity of associated keywords, within the characterization field. The optimization is based on aggregating keyword-field combinations such that the relevancy score for a search engine index entry cannot be based on the presence of a particular keyword in more than one characterization field within the search engine index entry. The optimized relevancy scores can be utilized to rank a set of search index entries based on at least in part the optimized relevancy score.

Prior to discussing the details of illustrative embodiments of the invention, it should be understood that the following description is presented largely in terms of steps and operations that may be performed by conventional computer components. These computer components, which may be grouped in a single location or distributed over a wide area, generally include computer processors, memory storage devices, display devices, input devices, etc. Memory storage devices provide one or more data stores where a comprehensive number of item descriptions represented as search index entries are contained. One skilled in the art would appreciate that subsets of items exists within the data store, the subsets corresponding to divisions within the data store. In circumstances where the computer components are distributed, the computer components are accessible to each other via communication links. Further, although the present invention will be described with regard to illustrative embodiments, one skilled in the relevant art will appreciate that the disclosed embodiments are illustrative in nature and should not be construed as limiting.

Figure 1:
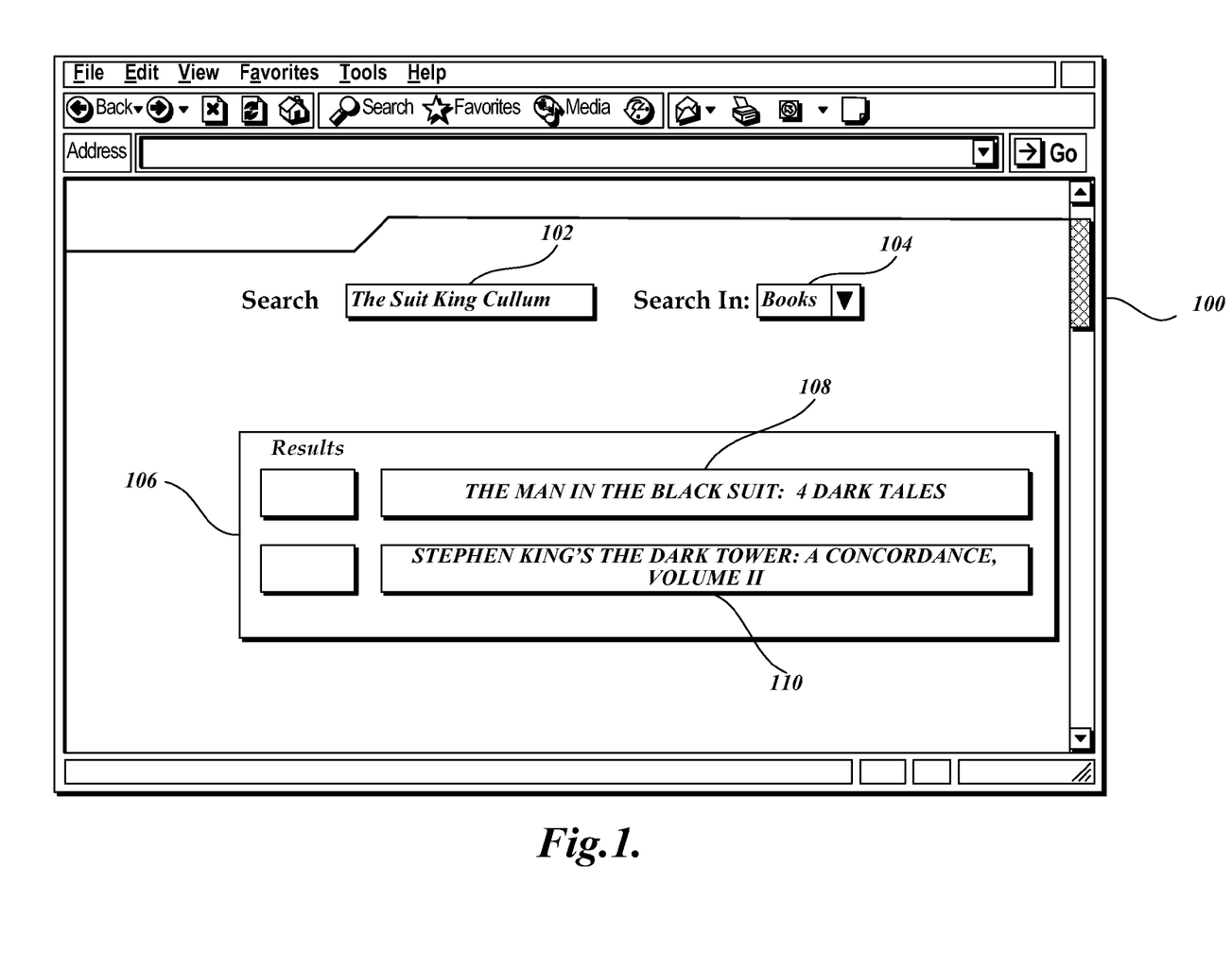
FIG. 1 is a screen display corresponding to a user interface for identifying relevant items in a search query of a search engine in accordance with an aspect of the present invention.

FIG. 1 represents a screen display corresponding to a user interface 100 for identifying relevant items in a search query of a search engine. In an illustrative embodiment, the search criteria can be in the form of characterizing words, phrases, or codes, e.g., keywords that are used to locate relevant items in a search query. Additionally, the search criteria can correspond to images, sounds, and other information. Still further, the search criteria can include additional characterization information, such as date information, that can be used to identify relevant content or limit a set of potentially relevant content.

With reference to FIG. 1, the user interface 100 includes a first input field 102 for obtaining keywords for the search criteria. In an illustrative example, the relevant keywords entered into the input field 102 are "The Suit," "King," and "Cullum," which could relate to a search for the publication, "The Man in the Black Suit" by Stephen King and John Cullum. The user interface 100 can also include an addition selection field 104 for limiting the set of content items to search. In the illustrative example, the additional selection field 104 has been selected to limit the search to "Books". As will be explained in greater detailed, based on a processing of the search criteria by the search engine, a list of the relevant items of content can be provided by the search engine. With continued reference to FIG. 1, the user interface 100 includes a search results field 106 that includes a prioritized list of content of items determined to be most relevant to the inputted search criteria. In the illustrative example, two publications, "The Man in the Black Suit: Four Dark Tales" 108 and "Stephen King's Dark Tower: A Concordance, Volume II" 110, have been identified as the most relevant items of content. Based on the returned search results, the user can submit additional or revised search criteria and/or select an identified item of content.

Figure 2A:
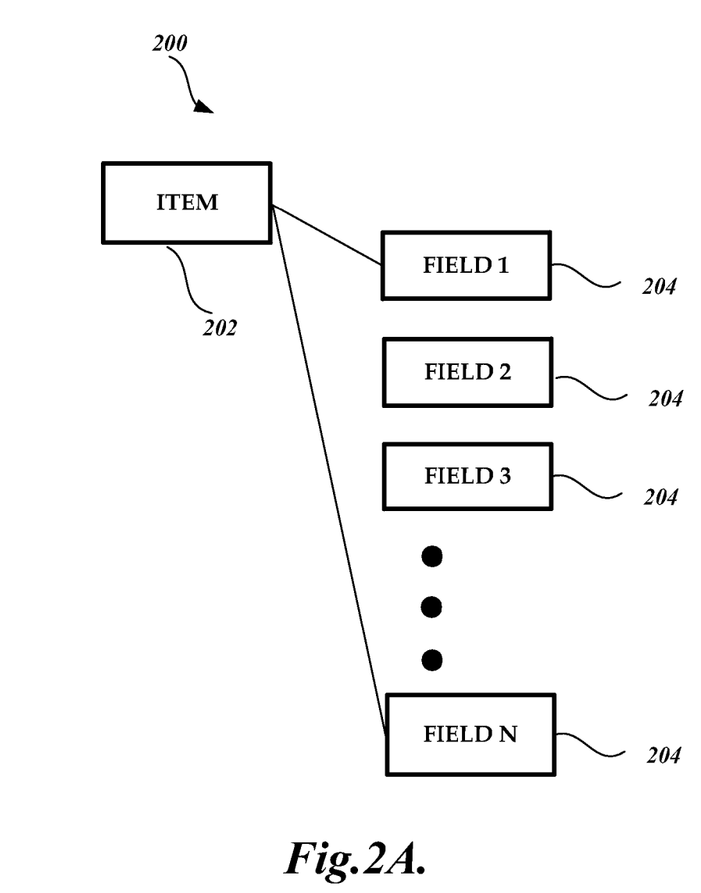
FIGS. 2A and 2B are block diagrams depicting a set of characterization fields corresponding to structured search index entries in accordance with an aspect of the present invention.
Figure 2B:
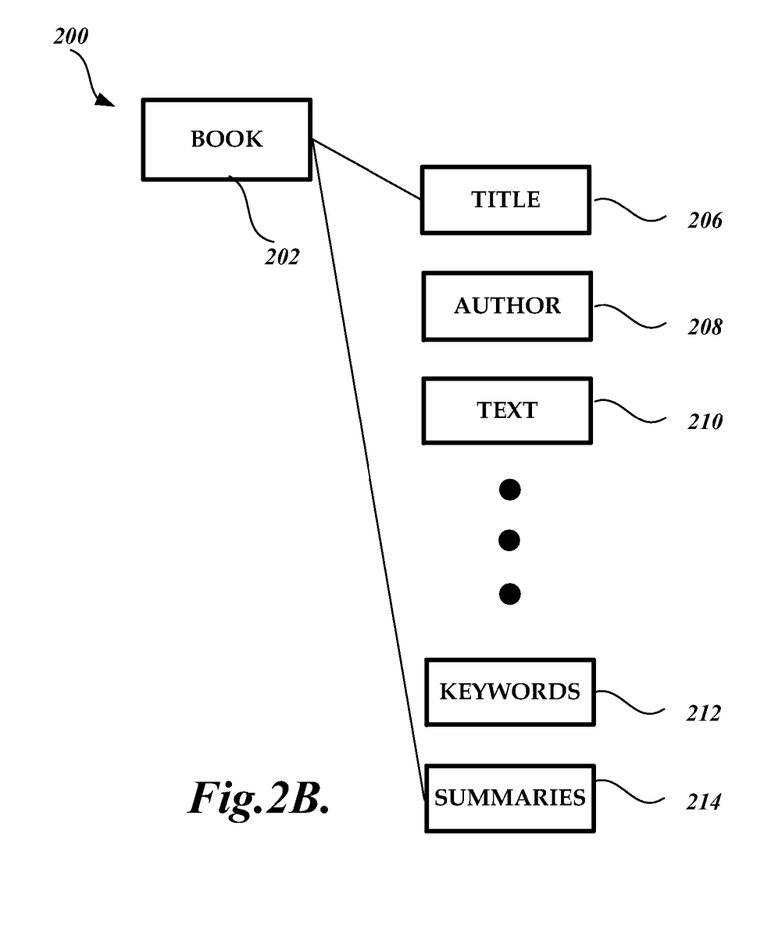

With reference now to FIGS. 2A and 2B, a block diagram 200 depicting a set of characterization fields 204 corresponding to structured set of information for search engine index entries will be described. With respect to FIG. 2A, each item 202 within the data store can be represented in a search index entry through the population of a number of characterization fields 204. Each field 204 includes one or more terms, symbols, and/or other data that describes an aspect of the item 202. As will be described in greater detail below, a set of processing rules will attempt to associate the terms, symbols, and/or other data to a set of submitted search word queries. In an illustrative embodiment, the fields 204 may be configured to apply generically to a set of items 202. In this embodiment, a search engine will populate the fields 204 of each index entry for a particular item 202 with the available information about the item 202. For example, a search index entry can be populated with a SKU number, quantity, distributor, and product details for a physical item for sale.

In an alternative embodiment, the fields 204 may be customized to hold information corresponding to aspects of particular items 202 or types of items 202. With reference now to FIG. 2B, as an example, assume that the search engine index will include information about a number of items 202, the number of items represented as a number of printed publications included in the search index. Accordingly, the search engine index entries have a set of structured characterization fields 204 that will be used to store information particular to printed publications. The fields 204 can include a title field 206 containing information about the title of the printed publication, an author field 208 containing information about author(s) of the printed publication, a text field 210 containing information about the substance of the printed publication (such as images of the publication, text of the publication, etc.), a keyword field 212 containing information related to keywords summarizing aspects of the printed publication, a summaries field 214 including information related to summaries or reviews of the printed publication and the like. One skilled in the relevant art will appreciate that the number, arrangement and types of fields 204 may vary. In one embodiment, however, three types of fields are provided: the title field 206, the author field 208, and the text field 210. In accordance with the example above, "Stephen King's The Man in the Black Suit" could be information included within the title field 206, "Stephen King, John Cullum, Peter Gerety, and Betty Ann Baker" could be information included in the author field 206, and at least a portion of the text of the book could be included in the text field 210. In an illustrative embodiment, each field 204 is populated with text, symbols or other data and can also remain blank if no information is available. Additionally, as mentioned above, the same or similar information may be found in multiple fields. Moreover, although the fields 206-214 are illustrated as being in a particular order, the fields may be ordered according to various organization criteria or, alternatively, unordered.

Figure 3:
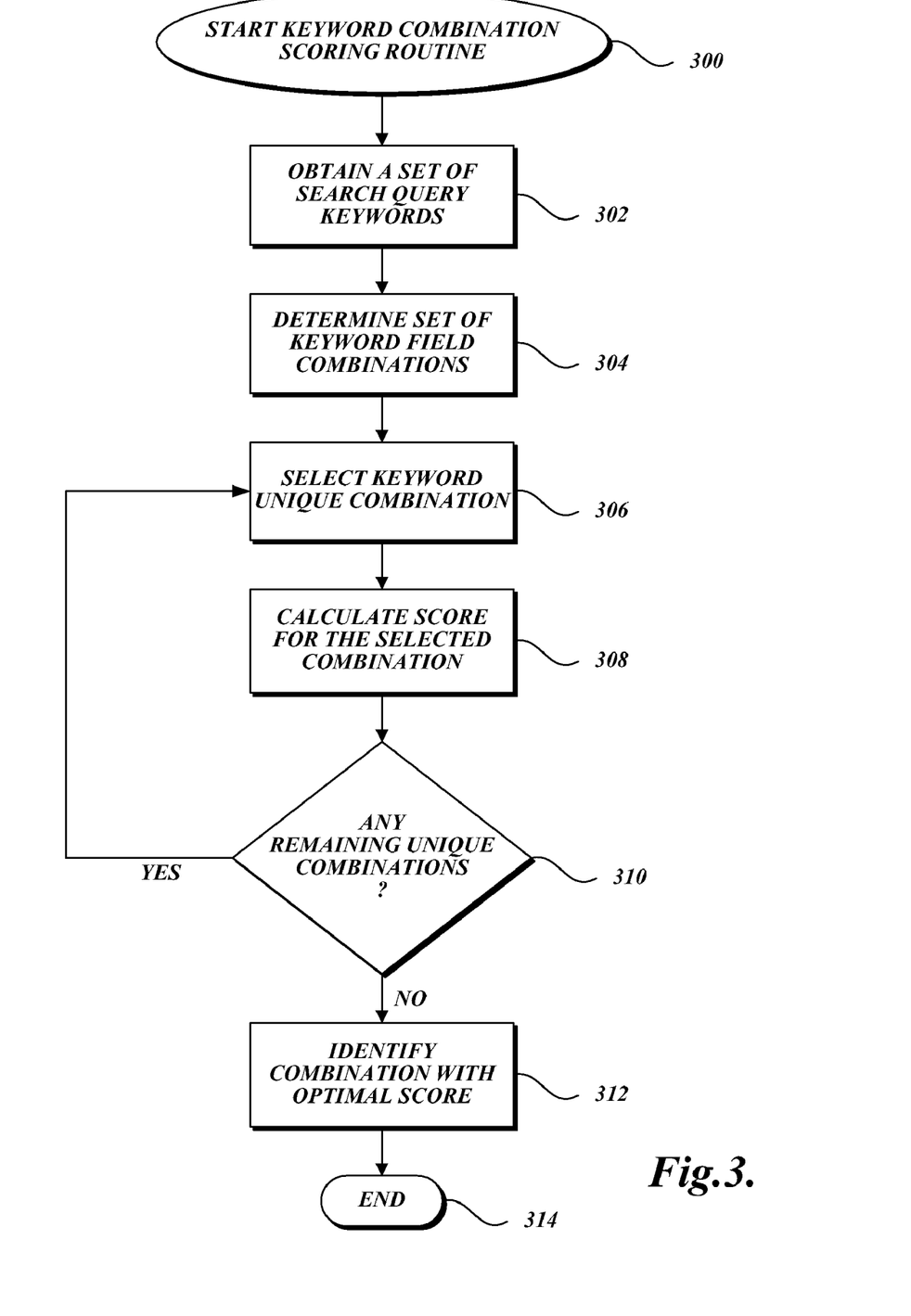
FIG. 3 is a flow diagram for determining an optimal keyword relevancy score for a set of potential keyword field combinations in accordance with an aspect of the present invention.

With reference now to FIG. 3, a flow diagram of a routine 300 for determining an optimal keyword relevancy score in a search query for a set of potential keyword field combinations in accordance with an aspect of the present invention will be described. At block 302, a set of keywords corresponding to a search query are obtained. In an illustrative embodiment, the set of keywords may be obtained from a user interface 100 (FIG. 1) that facilitates the collection and submission of search query keywords from users. In an illustrative embodiment, a search engine can do additional processing to the search query keywords, such as removing common terms from the collected search keywords, applying a spell checker, etc. As an example, a search engine may remove the term "The" from "The Suit" from the above referenced illustrative search criteria. Alternatively, one or more search query keywords may be inferred from user profiles, user activity or submitted from another computer program or service.

Figure 4:
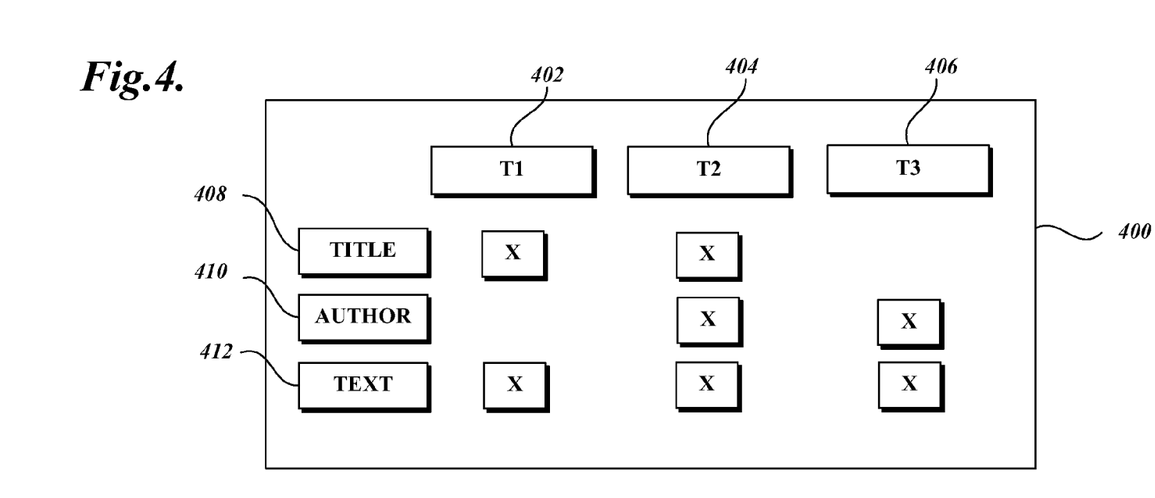
FIG. 4 is a diagram illustrative of a matrix for associating search query keywords to terms in a set of characterization fields in accordance with an aspect of the present invention.

At block 304, a set of possible keyword field combinations is enumerated. FIG. 4 is a diagram of a matrix 400 illustrating the association of search query keywords to terms in a set of characterization fields in accordance with an aspect of the present invention. For purposes of illustration, assume that a search query includes at least three terms to associate, "T1," "T2" and "T3." Further, for purposes of illustration assume that the search index queries include at least three characterization fields: "TITLE," "AUTHOR," and "TEXT." As shown by FIG. 4, the matrix 400 includes three columns 402, 404, and 406 which correspond to three search query keywords to be associated. The matrix 400 also includes three rows 408, 410, and 412 that correspond to the three characterization fields of the search index entries. Solely for purposes of a working example, assume that keyword "T1" is found in the "TITLE" and "TEXT" characterization fields, keyword "T2" is found in all the characterization fields and keyword "T3" is found in the "AUTHOR" and "TEXT" characterization fields.

With specific reference to the above-mentioned illustrative example, the matrix 400 may be utilized for processing the search query. Specifically, assume that the title field 408 includes the terms "Stephen King's The Man in the Black Suit." Moreover, the author field 410 includes the terms "Stephen King John Cullum Peter Gerety Betty Ann Baker." Still further, a line in the text field 412 includes among other terms, the terms "The Man in the Black Suit by Stephen King, John Cullum, Peter Gerety, and Betty Ann Baker." For a search query including the keywords "Suit," "King," and "Cullum", the three keywords could be associated with the three fields of the matrix 400. Namely, the matrix 400 would indicate that the keyword terms "Suit" and "King" would be present in the title field 408, the keyword terms "King" and "Cullum" would be present in the author field 410, and "Suit," "King," and "Cullum" with the text field 412.

Figure 5:
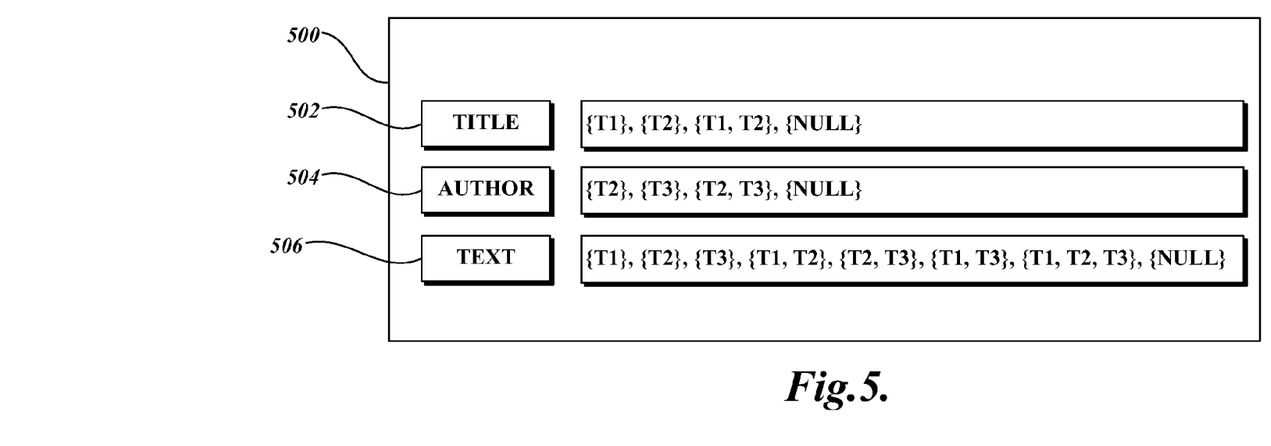
FIG. 5 is a block diagram illustrating a set of potential keyword field combinations for a search query in accordance with an aspect of the present invention.

FIG. 5 is a block diagram illustrating a set of potential keyword field combinations 500 for a search query in accordance with an aspect of the present invention. The set of potential keyword field combinations include three rows 502, 504, and 506, which correspond to the three characterization fields of the search index queries. With reference to the previous working example, the combinations associated with row 502, corresponding to the "TITLE" characterization field, includes keyword "T1" by itself, keyword "T2" by itself, keywords "T1" and "T2" together, and a Null set. Similarly, the combinations associated with row 504, corresponding to the "AUTHOR" characterization field, includes keyword "T2" by itself, keyword "T3" by itself, keywords "T2" and "T3" together, and a Null set. Finally, the combinations associated with row 506, corresponding to the "TEXT" characterization field, includes keyword "T1" by itself, keyword "T2" by itself, keyword "T3" by itself, keywords "T1" and "T2" together, keywords "T2" and "T3" together, keywords "T1" and "T3" together, keywords "T1," "T2," and "T3" all together, and a Null set.

With reference again to the illustrative example, the matrix 400 (FIG. 4) would indicate that potential keyword field combinations for the text field 506 would include keyword "Suit" by itself, keyword "King" by itself, keyword "Cullum" by itself, the combination of keywords "Suit" and "King", the combination of keywords "King" and "Cullum," the combination of keywords "Suit" and "Cullum," the combination of keywords "Suit," "King," and "Cullum," and a null set in which no keywords are deemed to be present. As previously mentioned, additional processing rules, such as proximity scoring, will assist in determining the best optimization of the potential keyword field combinations.

In another embodiment, the potential keyword field combinations relate to a particular order for the keywords found in the characterization field. With reference to FIG. 5, assume that keywords "T1," "T2," and "T3" must maintain some order. Accordingly, the combinations 500 associated with row 506, corresponding to the "TEXT" characterization field, include keyword "T1" by itself, keyword "T2" by itself, keyword "T3" by itself, the combination of keywords "T1" and "T2", the combination of keywords "T2" and "T3", the combination of keywords "T1," "T2," and "T3," and a Null set in which no keywords are deemed to be present in the field 506. In this embodiment, the combination 500 including keywords "T1" and "T3" is not considered a potential keyword field combination because the order of the keywords is not maintained. With reference again to the working example, a valid combination for Stephen King's "The Man in the Black Suit" for the text field 506 would include keyword "Suit" by itself, keyword "King" by itself, keyword "Cullum" by itself, the combination of keywords "Suit" and "King", the combination of keywords "King" and "Cullum," the combination of keywords "Suit," "King," and "Cullum," and a null set. Notice the combination of keywords "Suit" and "Cullum" has been removed.

Figure 6A:
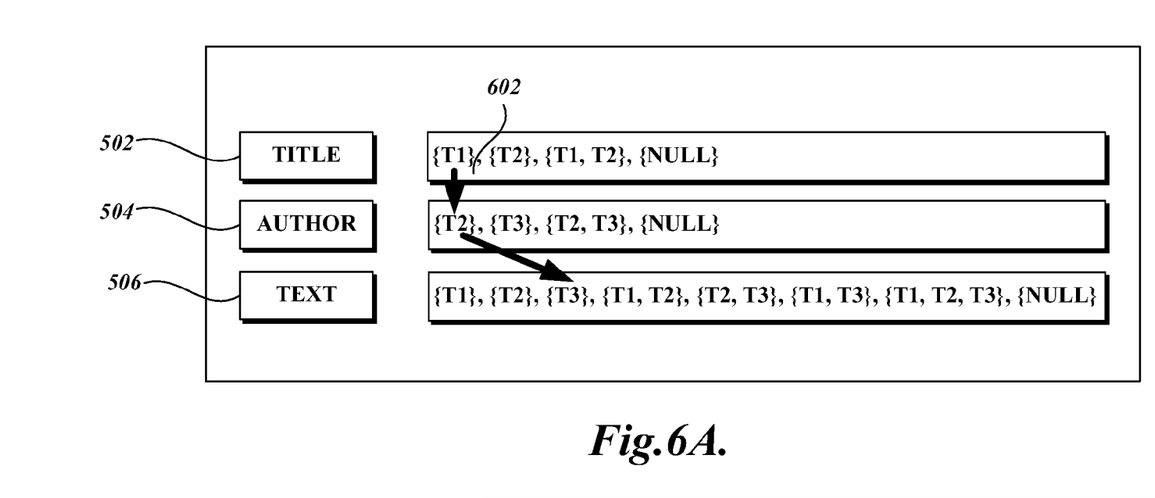
FIGS. 6A and 6B are block diagrams of the set of possible keyword field combinations illustrating the selection of keyword field combinations such that no keyword is associated in more than one characterization field.
Figure 6B:
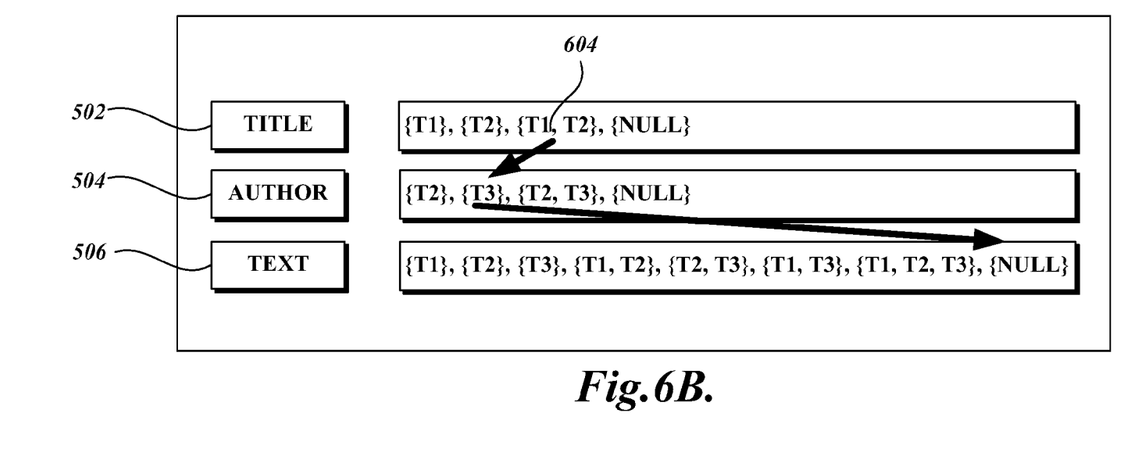

Returning to FIG. 3, at block 306, a first keyword field combination is obtained. In an illustrative embodiment, the keyword field combinations are selected in a manner such that no single keyword can be associated in more than one characterization field. FIGS. 6A and 6B are block diagrams of the set of possible keyword field combinations 500 illustrating the selection of keyword field combination such that no keyword is associated in more than one characterization field. With reference first to FIG. 6A, a potential keyword field combination 602 is generated by selecting keyword "T1" from row 502, keyword "T2" from row 504, and lastly, keyword "T3" from row 506. With reference next to FIG. 6B, for an alternative keyword field combination 604, keywords "T1" and "T2" are selected from row 502, keyword "T3" is selected from row 504, and lastly, the "NULL" set is selected from row 506. In both illustrations, no keyword is associated in more than one row. Further, not every keyword needs to be associated within a characterization field. Continuing with the illustrative example, a potential keyword field combination that would not include a keyword in more than one characterization field could be made of the keyword "Suit" for the title field 502, the keyword "King" for the author field 504, and the keyword "Cullum" for the text field 506. Another potential keyword field combination includes keywords "Suit" and "King" for the title field 502, the keyword "Cullum" for the author field 504, and null for the text field 506.

Returning to FIG. 3, once a keyword field combination has been selected, at block 306, a keyword relevancy score is calculated for the specific keyword field combination at block 308. In an illustrative embodiment, keyword relevancy scores may be calculated in a number of ways using one or more processing techniques such as programmatic rules, support vector machines, neural networks and the like. In an illustrative embodiment, the completion of the processing techniques results in an outcome in the form of a value. In one aspect, a value may be provided for each keyword that is found in the particular characterization field. In another aspect, value may be deducted for the omission of any keyword in the particular characterization field. In accordance with the example above, a value would be deducted from the overall keyword relevancy score when "Cullum" is not found in the title field 502. In a further aspect, value may be added and/or deducted based on the relationship between the keywords such as proximity between the associated keywords, the presence or omission of other non-keywords, and the like. One skilled in the relevant art will appreciate that any number of processing techniques may be utilized to determine the likelihood of an association of a keyword with information in a characterization field. In another embodiment of calculating the keyword relevancy score, weighted preferences may be given to specific characterization fields 204. For example, additional weight may be provided to the "AUTHOR" field 208 when the search query terms are intended to be keywords related to author names. The weighted preferences may be expressed in percentages.

At decision block 310, a test is conducted to determine whether there are any remaining potential keyword field combinations. If there are potential keyword field combinations remaining, then the routine 300 returns to block 304. The routine 300 can continue until all possible potential keyword field combinations have been scored. In another embodiment, some keyword relevancy scores for potential keyword field combinations may not be calculated if the keyword field combination cannot obtain a keyword relevancy score which is higher than a previously taken keyword field combination keyword relevancy score.

Alternatively, if there are no further keyword field combination, the routine 300 continues to block 312 where the routine 300 obtains the keyword relevancy scores for the set of potential keyword field combinations and determines an optimal score corresponding to a keyword field combination by identifying the highest keyword relevancy score. In another embodiment, identifying an optimal score is determined by updating a maximum relevancy score at block 308 each time a higher relevancy score from a new combination is calculated. At block 314, the routine terminates.

A list may be created from the optimal scores associated with a keyword field combination for each item in the set of items. The list places the item with the highest relevancy score into a first position and repeatedly places a next item with the next highest relevancy score into a next position of the list until no items remain within the set of items. Additionally, the relevancy scores may be factored into additional processing to identify which search engine index entries are most relevant to the submitted search query. Returning to FIG. 1, the ranked set of items corresponding to the optimized search query is then provided on the user interface 100 of the search engine. As shown, items corresponding to a ranked list 104 by using the keywords "Suit," "King," and "Cullum" are displayed.

While illustrative embodiments have been illustrated and described, it will be appreciated that various changes can be made therein without departing from the spirit and scope of the invention.

What is claimed is:

1. A system for determining an association of keywords to an item, the system comprising:
   a data store for storing information about the item, wherein the information stored on the data store includes two or more characterization fields that describe the item;
   an interface for obtaining one or more keywords; and
   a data processing component having instructions that, when executed, cause the data processing component to:
   in response to receiving a query including multiple keywords, determine a presence of an associated term for each of the multiple keywords in any of the characterization fields for the item;
   determine keyword combinations for each of the characterization fields for the item, each keyword combination comprising one or more associated terms present in a respective characterization field or no associated terms for t null keyword combination;
   determine a plurality of keyword field combinations, each keyword field combination including one keyword combination from each characterization field for the item, each associated term appearing at most once in each keyword field combination;
   calculate a relevancy score for at least a subset of the determined keyword field combinations with respect to the received query, a relevancy score calculation for a determined keyword field combination capable of being skipped if it is determined that the relevancy score for the determined keyword field combination is less than a previously determined relevancy score;
   select the keyword field combination with an optimal relevancy score for the item for use in ranking the item in results corresponding to the query; and
   provide for display a ranked list of items associated with the one or more keywords based at least in part upon the optimal relevance score for each item in the list.

2. The system of claim 1, wherein the data processing component further generates a relevant set of documents from a corpus of documents on the data store, wherein the relevant set of documents corresponds to information about a set of items.

3. The system of claim 1, wherein keywords associated with terms found in the two or more characterization fields of the item are associated in a continuous manner.

4. The system of claim 1, wherein the data processing component determines the plurality of keyword field combinations on at least three characterization fields of the item.

5. The system of claim 4, wherein the set of characterization fields include an author characterization field, a title characterization field, and a text characterization field.

6. The system of claim 1, wherein the two or more characterization fields corresponds to a structured schema associated with the items.

7. The system of claim 1, wherein the data processing component repeats determining the plurality of keyword field combinations, calculating the relevancy score, and selecting the keyword field combination with the optimal score for each item in the set of items.

8. The system of claim 1, wherein the data processing component generates a prioritized list of items associated with the one or more keywords based at least in part upon the optimal score for each item in the set of items.

9. The system of claim 1, wherein the data processing component calculates the relevancy score by applying a set of relevancy rules corresponding with associating keywords to terms within a characterization field.

10. The system of claim 1, wherein the data processing component calculates a relevancy score for the keyword field combination if the keyword field combination is able to obtain a relevancy score which is higher than a previously taken keyword field combination relevancy score.

11. A method for determining an association of keywords to an item, wherein the item is described according to two or more characterization fields, tile method comprising:
   obtaining one or more keywords;
   determining a presence of an associated term for each of the keywords in any of the characterization fields for the item;
   determining keyword combinations for each of the characterization fields for the item, each keyword combination comprising one or more associated terms present in a respective characterization field or no associated terms for a null keyword combination;
   determining a plurality of keyword field combinations, each keyword field combination including one keyword combination from each characterization field for the item, each associated term appearing at most once in each keyword field combination;
   calculating a keyword relevancy score for at least a subset of the determined keyword field combinations with respect to the one or more keywords, a keyword relevancy score calculation for a determined keyword field combination capable of being skipped if it is determined that the keyword relevancy score for the determined keyword field combination is less than a previously determined keyword relevancy score; identifying the keyword field combination with an optimal keyword relevancy score for the item; and
   providing for display a prioritized list of items associated with the one or more keywords based at least in part upon the optimal keyword relevance score for each item in the list.

12. The method of claim 11, wherein obtaining one or more keywords comprises removing the one or more keywords that are common keywords.

13. The method of claim 11, wherein calculating the keyword relevancy score comprises aggregating an outcome of a processing of keyword associating rules.

14. The method of claim 13, wherein the keyword associating rules correspond to an outcome based on the location of a keyword in a characterization field.

15. The method of claim 13, wherein the keyword associating rules correspond to an outcome base on a relationship of keywords within a characterization field.

16. The method of claim 11, wherein the plurality of keyword field combinations includes a keyword field combination including no associated keywords.

17. The method of claim 11, wherein the plurality of keyword field combinations includes all possible keyword field combinations for the set of keywords and the two or more characterization fields.

18. The method of claim 11, wherein the plurality of keyword field combinations includes a subset of all possible keyword field combinations for the set of keywords and the two or more characterization fields.

19. The method of claim 11, wherein keywords associated with terms found in the two or more characterization fields of the item are associated in a continuous manner.

20. The method of claim 11 wherein the plurality of keyword field combinations include at least three characterization fields of the item.

21. The method of claim 20, wherein the set of characterization fields include an author characterization field, a title characterization field, and a text characterization field.

22. A computer-readable media storage medium storing instructions for causing at least one processor to perform a method that identifies items relevant to a search query, the method comprising:
   identifying a set of items based on one or more keywords of the search query—each item including characterization fields storing terms that relate to the item;
   for each item in the set of items:
   determining a presence of an associated term for each of the keywords in any of the characterization fields for an item;
   determining keyword combinations for each of the characterization fields for the item, each keyword combination comprising one or more associated terms present in a respective characterization field or no associated terms for a null keyword combination;
   determining a plurality of keyword field combinations, each keyword field combination including one keyword combination from each characterization field for the item, each keyword appearing at most once in each keyword field combination; and
   calculating a keyword relevancy score for each at least a subset of the determined keyword field combinations until identifying the keyword field combination with an optimal keyword relevancy score for the item, wherein a keyword relevancy score calculation for a determined keyword field combination is capable of being skipped if it is determined that the keyword relevancy score for the determined keyword field combination is less than a previously determined keyword relevancy score;
   ranking the set of items corresponding to the optimal keyword relevancy scores for each item; and
   provide for display the set of ranked items corresponding to the optimized keyword relevancy scores for each item.

23. The computer-readable storage medium of claim 22, wherein the method further comprises generating display information for the ranked set of items corresponding to the optimal keyword relevancy scores for each item on an interface.

24. The computer-readable storage medium of claim 22, wherein calculating the keyword relevancy score comprises aggregating an outcome of a processing of keyword associating rules.

25. The computer-readable storage medium of claim 24, wherein the keyword associating rules correspond to an outcome based on the location of a keyword in a characterization field.

26. The computer-readable storage medium of claim 24, wherein the keyword associating rules correspond to an outcome base on a relationship of keywords within a characterization field.

27. The computer-readable storage medium of claim 22, wherein the plurality of keyword field combinations includes a keyword field combination including no associated keywords.

28. The computer-readable storage medium of claim 22, wherein the plurality of keyword field combinations includes all possible keyword field combinations for the set of keywords and the two or more characterization fields.

29. The computer-readable storage medium of claim 22, wherein the plurality of keyword field combinations includes a subset of all possible keyword field combinations for the set of keywords and the two or more characterization fields.

30. The computer-readable media storage medium of claim 22, wherein keywords associated with terms found in the two or more characterization fields of the item are associated in a continuous manner.

31. A computer-readable storage medium having computer-executable components for providing a search engine configured for determining an association of keywords to a set of items that provides optimized search results, the search engine comprising:
   a data store component for storing information about the set of items, wherein the information stored and the data store includes two or more characterization fields that describe aspects of each of the set of items;
   an interface component for obtaining one or more keywords; and
   a data processing component having an executable component, which, when executed, causes the data processing component to, for each item in the set of items:
   determine a presence of an associated term for each of the keywords in any of the characterization fields for the item;
   determine keyword combinations for each of the characterization fields for the item, each keyword combination comprising one or more associated terms present in a respective characterization field or no associated fields for a null keyword combination;
   determine a plurality of keyword field combinations, each keyword field combination including one keyword combination from each characterization field for the item, each associated term appearing at most once in each keyword field combination;
   calculate a keyword relevancy score for at least a subset of the determined keyword field combinations, a keyword relevancy score calculation for a determined keyword field combination capable of being skipped if it is determined that the keyword relevancy score for the determined keyword field combination is less than a previously determined keyword relevancy score;
   identify the keyword field combination with an optimal keyword relevancy score for each item;
   rank the set of items corresponding to tile optimal keyword relevance scores for each item; and
   provide for display the set of ranked items corresponding to the optimized keyword relevancy scores for each item.

32. The computer-readable storage medium of claim 31, wherein the data processing component ranks the set of items by sorting the set of items from a highest optimal keyword relevancy score to a lowest optimal keyword relevancy score.

* * * * *

UNITED STATES PATENT AND TRADEMARK OFFICE
CERTIFICATE OF CORRECTION

PATENT NO. : 7,634,475 B1  Page 1 of 1
APPLICATION NO. : 11/684805
DATED : December 15, 2009
INVENTOR(S) : Diane Hernek It is certified that error appears in the above-identified patent and that said Letters Patent is hereby corrected as shown below:

In the Claims

Claim 1, Column 9, Line 30, please delete "t" and insert -- a --

Claim 11, Column 10, Line 19, please delete "tile" and insert -- the --

Claim 11, Column 10, Lines 41-43, please correct the formatting as follows
-- determined keyword relevancy score;
 identifying the keyword field combination with an optimal
 keyword relevancy score for the item; and --

Claim 31, Column 12, Line 24, please delete "and" and insert -- on --

Claim 31, Column 12, Line 38, please delete "fields" and insert -- terms --

Claim 31, Column 12, Line 54, please delete "tile" and insert -- the --.

Signed and Sealed this

First Day of June, 2010

David J. Kappos
*Director of the United States Patent and Trademark Office*